United States Patent
Schwartz et al.

(10) Patent No.: US 10,532,661 B2
(45) Date of Patent: Jan. 14, 2020

(54) SYSTEM AND METHOD FOR HEATING ELECTRIFIED VEHICLE

(71) Applicant: Ford Global Technologies, LLC, Dearborn, MI (US)

(72) Inventors: William Samuel Schwartz, Pleasant Ridge, MI (US); Angel Fernando Porras, Dearborn, MI (US); Timothy Noah Blatchley, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 353 days.

(21) Appl. No.: 15/681,585

(22) Filed: Aug. 21, 2017

(65) Prior Publication Data
US 2019/0054825 A1    Feb. 21, 2019

(51) Int. Cl.
*B60L 1/08*     (2006.01)
*B60H 1/00*    (2006.01)

(52) U.S. Cl.
CPC ............ *B60L 1/08* (2013.01); *B60H 1/00007* (2013.01); *B60H 1/00807* (2013.01); *B60L 2240/34* (2013.01)

(58) Field of Classification Search
CPC ...... B60L 1/08; B60L 1/10; B60L 1/12; B60L 2240/34; B60H 1/00007; B60H 1/00807; B60H 1/2226
USPC ......................................................... 237/8 A
See application file for complete search history.

(56) References Cited

U.S. PATENT DOCUMENTS

| | | | |
|---|---|---|---|
| 6,040,561 A | 3/2000 | Murty | |
| 8,191,662 B2 | 6/2012 | Sauvlet et al. | |
| 8,362,398 B2 | 1/2013 | Heiden et al. | |
| 8,453,722 B2 | 6/2013 | Zeigler et al. | |
| 9,067,475 B1 | 6/2015 | Jeong | |
| 9,150,132 B2 | 10/2015 | Hoke et al. | |
| 9,517,681 B2 | 12/2016 | Alpert | |
| 10,124,651 B2 * | 11/2018 | Blatchley | B60H 1/034 |
| 10,279,650 B2 * | 5/2019 | Maranville | B60H 1/00392 |
| 2010/0187211 A1 | 7/2010 | Eisenhour et al. | |
| 2013/0119042 A1 | 5/2013 | Eisenhour et al. | |
| 2013/0168458 A1 * | 7/2013 | Ichishi | B60H 1/004 237/2 A |
| 2013/0292482 A1 * | 11/2013 | Hashigaya | B60H 1/00007 237/28 |
| 2014/0346160 A1 | 11/2014 | Moench et al. | |

(Continued)

FOREIGN PATENT DOCUMENTS

FR    3029847 A1    12/2014
JP    2011136625    7/2011

OTHER PUBLICATIONS

"Search InnovationQ Plus—IP.com Sep. 25, 2019—2.pdf", InnovationQ Plus online search, ip.com, Sep. 26, 2019.*

*Primary Examiner* — Gregory L Huson
*Assistant Examiner* — Daniel E Namay
(74) *Attorney, Agent, or Firm* — David B. Kelley; Carlson, Gaskey & Olds, P.C.

(57) ABSTRACT

An exemplary electrified vehicle includes a passenger cabin, and an infrared heater configured to radiate heat for conditioning the passenger cabin. The vehicle further includes a heating device configured to heat airflow for conditioning the passenger cabin. Further, the vehicle includes a controller configured to selectively command a change in an output of the heating device based on an amount of power available to the infrared heater.

20 Claims, 6 Drawing Sheets

(56) References Cited

U.S. PATENT DOCUMENTS

| | | |
|---|---|---|
| 2015/0183296 A1 | 7/2015 | Ragazzi |
| 2016/0144685 A1 | 5/2016 | Ochiai et al. |
| 2016/0318499 A1* | 11/2016 | Yamanaka ............ B60W 10/06 |
| 2016/0332505 A1* | 11/2016 | Yamanaka ............ B60H 1/143 |
| 2017/0080778 A1* | 3/2017 | Suzuki ............... B60H 1/00921 |
| 2017/0174045 A1* | 6/2017 | Shimauchi ......... B60H 1/00064 |
| 2017/0282689 A1* | 10/2017 | Miyakoshi .............. F25B 49/02 |

* cited by examiner

SYSTEM AND METHOD FOR HEATING ELECTRIFIED VEHICLE

TECHNICAL FIELD

This disclosure relates to a system and method for heating an electrified vehicle. An exemplary electrified vehicle includes a passenger cabin conditioned by an infrared heater configured to radiate heat and a heating device configured to heat airflow.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Electrified vehicles often present unique thermal management challenges. For example, achieving desired passenger cabin comfort levels within the electrified vehicle must be balanced against maximizing the fuel economy and range of the electrified vehicle.

SUMMARY

An electrified vehicle according to an exemplary aspect of the present disclosure includes, among other things, a passenger cabin, an infrared heater configured to radiate heat for conditioning the passenger cabin, a heating device configured to heat airflow for conditioning the passenger cabin, and a controller. The controller is configured to selectively command a change in an output of the heating device based on an amount of power available to the infrared heater.

In a further non-limiting embodiment of the foregoing vehicle, the heating device is controlled based on a target value, and the controller is configured to selectively change the target value based on an amount of power available to the infrared heater.

In a further non-limiting embodiment of any of the foregoing vehicles, the controller is configured to selectively decrease the target value when sufficient power is available to the infrared heater.

In a further non-limiting embodiment of any of the foregoing vehicles, the controller is configured to gradually decrease the target value when sufficient power is available to the infrared heater.

In a further non-limiting embodiment of any of the foregoing vehicles, the heating device includes a heater core fed by coolant, and the target value is a temperature of coolant at an inlet of the heater core.

In a further non-limiting embodiment of any of the foregoing vehicles, the heating device includes an air heater, and the target value is an amount of power consumed by the air heater.

In a further non-limiting embodiment of any of the foregoing vehicles, the heating device includes an air heater, and the target value is a discharge air temperature.

In a further non-limiting embodiment of any of the foregoing vehicles, the heating device is a coolant heater, and wherein the target value is a coolant temperature.

In a further non-limiting embodiment of any of the foregoing vehicles, the controller is configured to selectively change the output of the heating device based on the amount of power available to the infrared heater, a temperature of the passenger cabin, and an occupancy level of the passenger cabin.

In a further non-limiting embodiment of any of the foregoing vehicles, the infrared heater is one of a plurality of infrared heaters configured to radiate heat for conditioning the passenger cabin.

In a further non-limiting embodiment of any of the foregoing vehicles, the infrared heater is powered by a DC/DC converter.

A method according to an exemplary aspect of the present disclosure includes, among other things, conditioning a passenger cabin of a vehicle by radiating heat with an infrared heater and by heating airflow with a heating device, and changing an output of the heating device based on an amount of power available to the infrared heater.

In a further non-limiting embodiment of the foregoing method, the method includes controlling the heating device based on a target value and changing the target value based on an amount of power available to the infrared heater.

In a further non-limiting embodiment of any of the foregoing methods, the method further includes decreasing the target value when sufficient power is available to the infrared heater.

In a further non-limiting embodiment of any of the foregoing methods, the method further includes gradually decreasing the target value when sufficient power is available to the infrared heater.

In a further non-limiting embodiment of any of the foregoing methods, the heating device includes a heater core fed by coolant, and wherein the target value is a temperature of coolant at an inlet of the heater core.

In a further non-limiting embodiment of any of the foregoing methods, the heating device includes an air heater, and wherein the target value is an amount of power consumed by the air heater.

In a further non-limiting embodiment of any of the foregoing methods, the heating device includes an air heater, and wherein the target value is a discharge air temperature.

In a further non-limiting embodiment of any of the foregoing methods, heating device is a coolant heater, and wherein the target value is a coolant temperature.

In a further non-limiting embodiment of any of the foregoing methods, the method further includes changing an output of the heating device based on an amount of power available to the infrared heater, a temperature of the passenger cabin, and an occupancy level of the passenger cabin.

BRIEF DESCRIPTION OF THE DRAWINGS

FIG. 4 illustrates an exemplary control strategy for controlling infrared heaters and a heating device configured to heat airflow. In FIG. 4, the heating device is a heater core controlled based on a coolant inlet target temperature.

FIG. 5 illustrates an exemplary control strategy for controlling infrared heaters and a heating device configured to heat airflow. In FIG. 5, the heating device is an air heater controlled based on an amount of power consumed by the air heater.

FIG. 6 illustrates an exemplary control strategy for controlling infrared heaters and a heating device configured to heat airflow. In FIG. 6, the heating device is an air heater controlled based on a discharge air temperature.

FIG. 7 illustrates an exemplary control strategy for controlling infrared heaters and a heating device configured to heat airflow. In FIG. 7, the heating device is a coolant heater controlled based on a coolant temperature.

DETAILED DESCRIPTION

This disclosure relates to a system and method for heating an electrified vehicle. An exemplary electrified vehicle includes a passenger cabin and an infrared heater configured to radiate heat for conditioning the passenger cabin. The vehicle further includes a heating device configured to heat airflow for conditioning the passenger cabin. Further, the vehicle includes a controller configured to selectively command a change in an output of the heating device based on an amount of power available to the infrared heater. In this way, the vehicle provides localized heat to the vehicle occupants using the infrared heater, which increases comfort, while also reducing the load on the heating device, which in turn increases vehicle efficiency and, in the case of BEVs for example, extends vehicle range.

Figure 1:
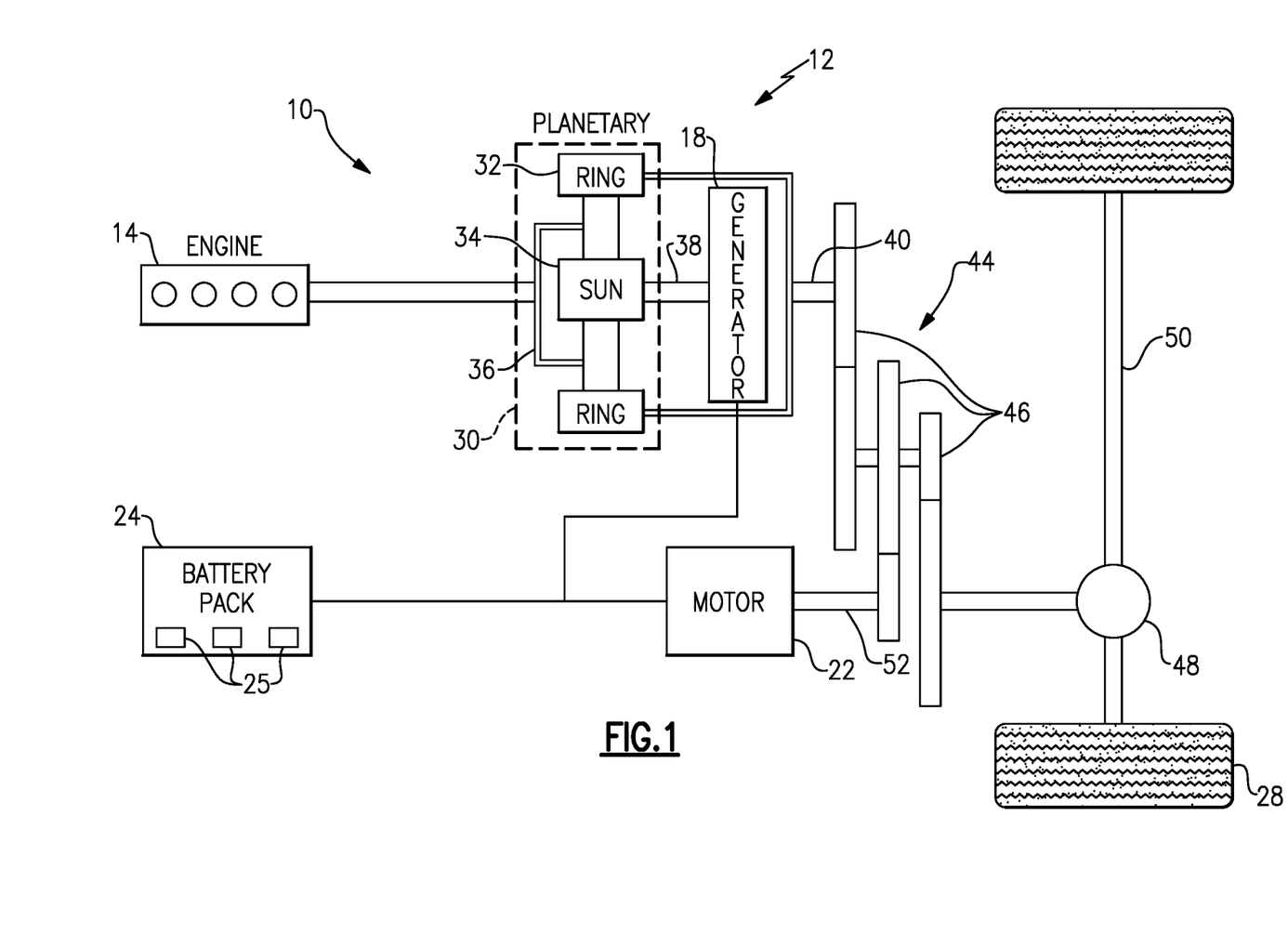
FIG. 1 schematically illustrates a powertrain of an electrified vehicle.

Referring to the drawings, FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, micro hybrids, plug-in hybrids, and battery electric vehicles.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. In another example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

In order to improve the fuel economy and overall efficiency of the electrified vehicle 12, the size of the engine 14 may be reduced and operated at higher efficiencies, thereby potentially degrading vehicle warm up capabilities. Systems and methods for actively compensating for this reduced heat generation from the engine 14 are therefore detailed below.

Figure 2:
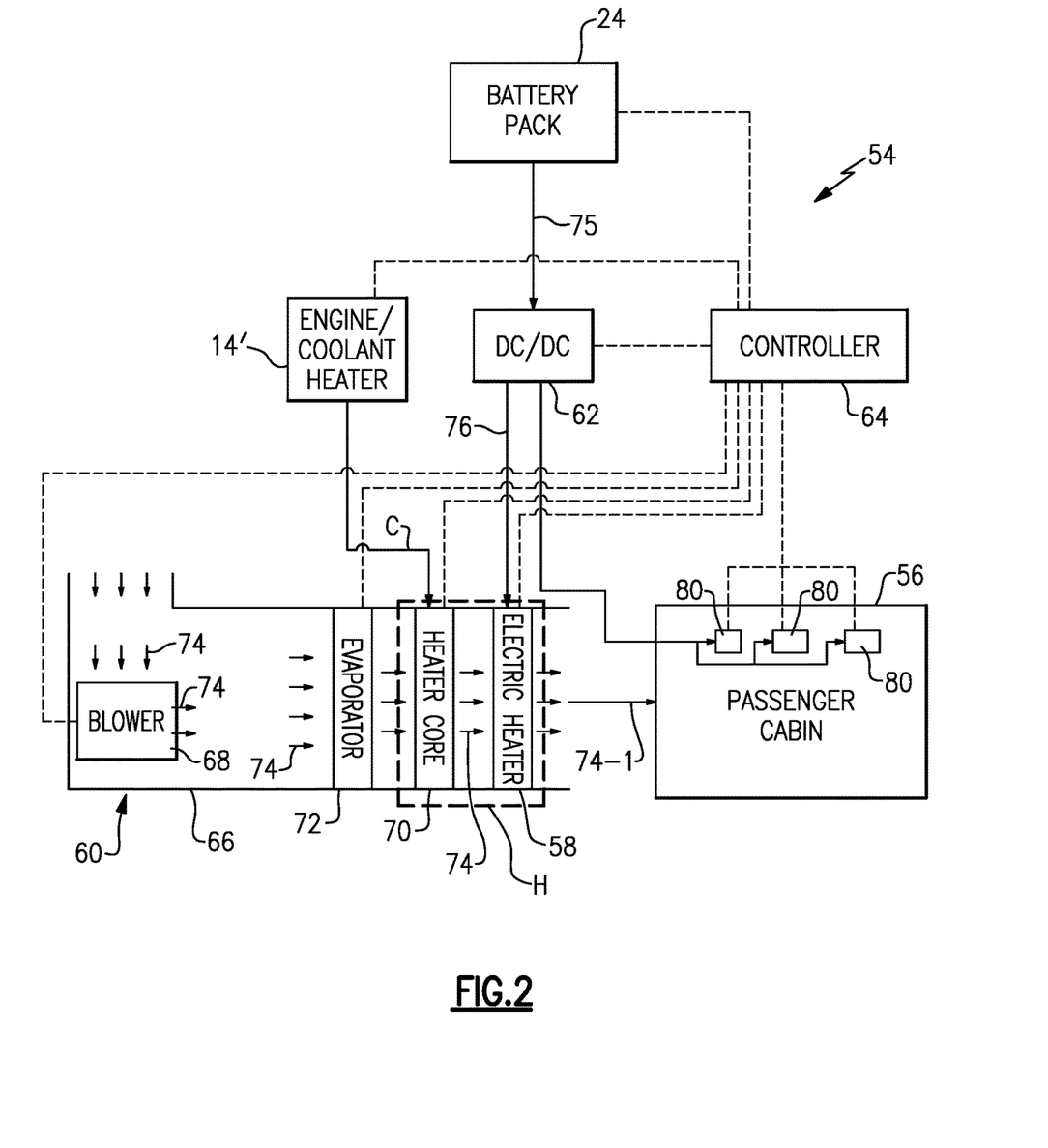
FIG. 2 illustrates a vehicle system of an electrified vehicle.

FIG. 2 is a highly schematic depiction of a vehicle system 54 that may be employed within an electrified vehicle, such as the electrified vehicle 12 of FIG. 1. The various components of the vehicle system 54 are shown schematically to better illustrate the features of this disclosure. These components, however, are not necessarily depicted in the exact locations where they would be found in an actual vehicle and are not necessarily shown to scale.

The vehicle system 54 is adapted to deliver conditioned airflow 74-1 at a desired temperature to a passenger cabin 56 of the electrified vehicle 12. In a non-limiting embodiment, a heating device H is controlled to augment the temperature of the conditioned airflow 74-1 delivered to the passenger cabin 56. In one particular embodiment, such as in a PHEV, the heating device H is controlled to augment the temperature of the conditioned airflow 74-1 delivered to the passenger cabin 56 by the heater core 70, which transfers heat from a heat source 14', which could be the engine 14, via engine coolant C circulating between the heat source 14' and the heater core 70. In another embodiment, such as in BEVs, the heat source 14' is provided by a coolant heater, which may be electrically powered. The coolant heater heats coolant circulating between the coolant heater and the heater core 70. While both the electrically powered heater 58 and the heater core 70 are illustrated in FIG. 2, it should be understood that the heating device H may, in some examples, only include one of the electrically powered heater 58 and the heater core 70. Alternatively, the heating device H can include both the electrically powered heater 58 and the heater core 70, both of which may be used simultaneously to augment the temperature of the conditioned airflow 74-1.

The exemplary vehicle system 54 may include a heating, ventilation, and air conditioning (HVAC) system 60, the heat source 14', the heating device(s) H, a DC/DC converter 62, the battery pack 24, and a controller 64. The HVAC system 60 is equipped to modify a temperature inside the passenger cabin 56. In a non-limiting embodiment, the HVAC system 60 includes an HVAC casing 66 and a blower 68, the heating device(s) H, and an evaporator 72 housed inside the HVAC casing 66. The blower 68 may be controlled to cause airflow 74 to flow through the HVAC casing 66 and into the passenger cabin 56. In a non-limiting embodiment, the blower 68 is a variable speed blower for forcing the airflow 74 through the HVAC casing 66, through the various heating and cooling elements, and then into the passenger cabin 56.

In one example, if heating is demanded within the passenger cabin 56 (e.g., by a driver/operator/passenger), coolant C heated by the heat source 14' flows to the heater core 70 for exchanging heat with airflow 74 that is blown across the heater core 70 by the blower 68. The airflow 74 may enter the HVAC casing 66 from outside the vehicle, for example. The relatively warm coolant C from the heat source 14' loses its heat to the airflow 74 within the heater core 70, and the conditioned airflow 74-1 then flows into the passenger cabin 56, thereby heating it.

In another example, the airflow 74 heated by the heater core 70 may be heated an additional amount by actuating the electrically powered heater 58. In yet another example, no heater core 70 is present and the airflow 74 is heated by the electrically powered heater 58 alone. The electrically powered heater 58 may be a positive temperature coefficient (PTC) heater or a resistive heating device, as examples. Further, the electrically powered heater 58 could be either a low voltage device or a high voltage device and may be selected such that its maximum regulating temperature is within the optimal comfort level temperature range of the passenger cabin 56. Although a single electrically powered heater 58 is shown in FIG. 2, it should be understood that the vehicle system 54 could include one or more electrically powered heater 58.

The electrically powered heater 58 could be mounted at various locations inside the HVAC casing 66. For example, in a non-limiting embodiment, the electrically powered heater 58 is positioned between the heater core 70 and the passenger cabin 56. Other mounting locations are also contemplated within the scope of this disclosure.

In a first non-limiting embodiment, a first DC output 75 from the battery pack 24 may be used to power the electrically powered heater 58, such as when the electrically powered heater 58 is a high voltage device. In a second non-limiting embodiment, a second DC output from the DC/DC converter 62 is used to power the electrically powered heater 58, such as when the electrically powered heater 58 is a low voltage device. For example, the first DC output 75 from the battery pack 24 may be received by the DC/DC converter 62. The DC/DC converter 62 may be configured as a step down converter that changes the first DC output 75 from the battery pack 24 from one voltage level to another, lower voltage level. The second DC output 76 from the DC/DC converter 62 is then used to power the electrically powered heater 58.

The controller 64 may be programmed with executable instructions for interfacing with and operating the various components of the vehicle system 54. The controller 64 includes various inputs and outputs for interfacing with the components of the vehicle system 54, including but not limited to, the HVAC system 60, the heat source 14', the battery pack 24, the DC/DC converter 62, and the electrically powered heater 58. The controller 64 additionally includes a processing unit and non-transitory memory for executing the various control strategies and modes of the vehicle system 54.

In a non-limiting embodiment, the controller 64 controls the HVAC system 60 to heat the passenger cabin 56 to a desired comfort level. In this disclosure, the passenger cabin 56 includes a plurality of infrared heaters 80 configured to provide localized heat within the passenger cabin 56, which in turn can decrease the load on the HVAC system 60 to achieve the same level of passenger comfort. The infrared heaters 80 may be low voltage devices powered by an output of the DC/DC converter 62 or may be high voltage devices powered by an output of the battery pack 24. The controller 64 is configured to selectively activate one or more of the infrared heaters 80 to provide radiant heat at desired locations within the passenger cabin 56.

The infrared heaters 80 may be any known type of infrared heater configured to radiate heat. The infrared heaters 80 are used to provide a localized heat directly to the occupants of the vehicle in order to increase passenger comfort and, in turn, reduce a load on the heating device(s) H.

Figure 3:
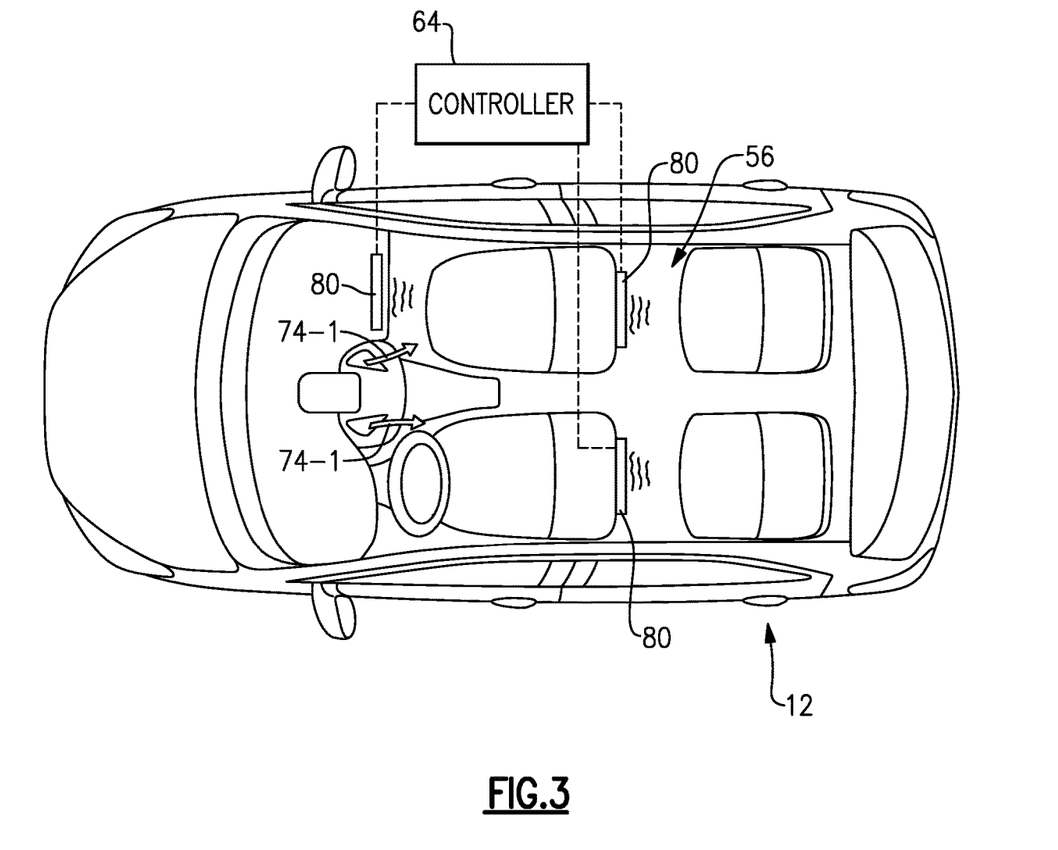
FIG. 3 illustrates a vehicle from a top perspective, and illustrates a plurality of infrared heaters within the vehicle.

FIG. 3 illustrates an example electrified vehicle 12 from a top perspective, and specifically illustrates three infrared heaters 80. The controller 64 is configured to selectively activate each of the infrared heaters 80, including selectively turning the infrared heaters 80 on and off, and changing an output level of the infrared heaters 80. While three infrared heaters 80 are illustrated in FIGS. 2 and 3, it should be understood that this disclosure extends to vehicles having one or more infrared heaters. Further, the infrared heaters 80 need not be placed as shown in FIG. 3 in the passenger cabin 56, so long as the radiant heat from the infrared heaters 80 can be directed to the occupants of the vehicle. It should also be understood that the infrared heaters 80 are shown in example locations in FIG. 3, and that this disclosure extends to vehicles with infrared heaters 80 in locations other than those shown.

The controller 64 is configured to selectively change an output of the heating device H based on an amount of power available to one or more of the infrared heaters 80. That is, during operation of the vehicle 12, the amount of power available from the DC/DC converter, for example, may vary depending on certain vehicle conditions. If sufficient power is available to the infrared heaters 80, then they may be run, and a target control value (such as power) of the heating device H can be offset, reducing the system load, which increases efficiency. In the case of BEVs, for example, the reduced system load ultimately increases the range of the electrified vehicle 12 through a reduction in power consumption of the electric coolant heater for example as a result of the system load reduction.

As noted above, there are a number of different heating devices H that are contemplated by this disclosure. Different heating devices H are controlled to produce an output based on different target control values (e.g., "target values" or "targets"). For example, when the heating device H is a heater core 70, the target control value may be a heater core coolant inlet temperature. When the heating device H is an electrically powered heater 58, the target control value may be an amount of power consumed by the electrically powered heater 58. These and more examples will be described below with reference to FIGS. 4-7.

Figure 4:
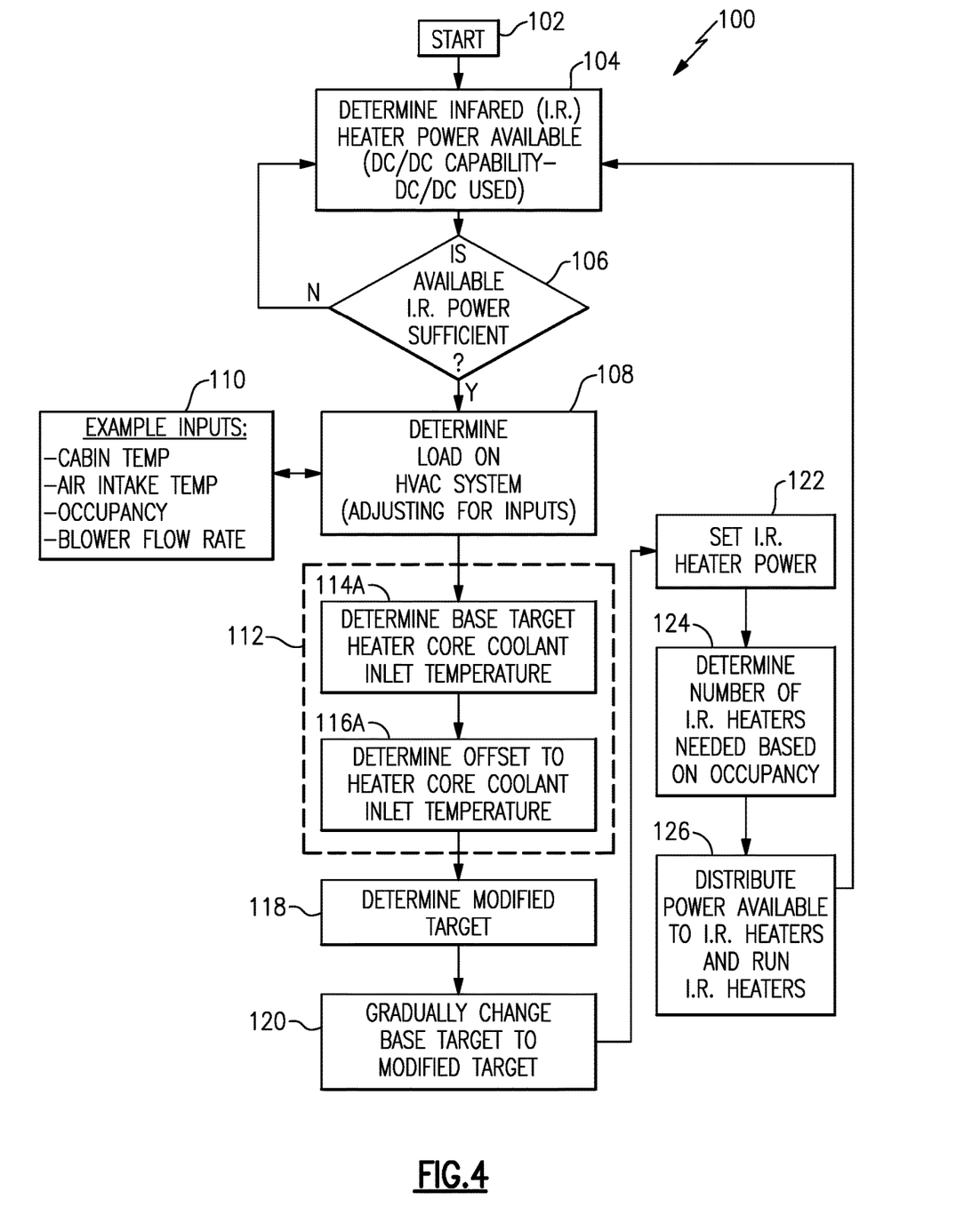

FIG. 4 schematically illustrates a method according to this disclosure, which is embodied in a control strategy 100 for controlling the vehicle system 54. FIG. 4 specifically relates to a vehicle system 54 where the heating device H is a heater core, such as the heater core 70. The control strategy 100 includes changing an output of the heating device H based on an amount of power available to one or more of the infrared heaters 80. The controller 64 can be programmed with one or more algorithms adapted to execute the control strategy 100 or any other control strategy. In a non-limiting embodiment, the control strategy 100 is stored as executable instructions in the non-transitory memory of the controller 64.

The control strategy 100 begins at block 102. At block 104, the control strategy 100 undergoes a series of calculations for determining the amount of power that is available for powering the infrared heaters 80. In this example, the power available to the infrared heaters 80 may be obtained by subtracting the DC/DC power used from the available DC/DC power.

Based on these factors, at block 106, the control strategy 100 determines whether the DC/DC power available to the infrared heaters 80 is sufficient to operate the infrared heaters 80. Whether the power is sufficient may be based on a known minimum power value which is required for operation. If the power available is sufficient for operation, the control strategy continues to block 108.

At block 108, the control strategy 100 determines a load on the HVAC system 60, including inputs 110 such as desired passenger cabin temperature, intake temperature of the airflow 74, vehicle occupancy, and a flow rate of the blower 68. The load of the HVAC system 60 may also be determined by referencing a look-up table stored in the memory of the controller 64.

At this point in the control strategy 100, this disclosure varies based on the type of heating device(s) H in the vehicle system 54, and how that heating device (or devices) H is controlled. Specifically, the heating device H is a particular heating device controlled based on a target value, and the control strategy 100 selectively changes that target value to reduce an overall load on the system. Again, in the example of FIG. 4, a heating device-specific portion of the control strategy 112 relates to a vehicle system 54 including a heater core 70 controlled based on a target value, which is a temperature of coolant C at an inlet of the heater core 70. While different heating device-specific portions 112 are shown across FIGS. 5-7, each of the control strategies is configured to selectively change the target value of the heating device H, and in turn change an output of the heating device H, based on an amount of power available to the infrared heaters 80. Specifically, the control strategy 100 is configured to reduce the target value of the heating device H when sufficient power is available to the infrared heaters 80.

In FIG. 4, at block 114A, the control strategy 100 determines a base target value for coolant C entering the heater core 70. The base target value is determined based on the determination in block 108, for example.

At block 116A, the control strategy then determines an offset to the base target value based on the available power to the infrared heaters 80, obtained at block 104. In this example, the offset is a reduction in a temperature of coolant C at the inlet of the heater core. By reducing the coolant inlet temperature the heater core 70 requires, the load on the HVAC system 60 is reduced. The offset may be determined as a function of the load on the HVAC system 60, obtained at block 108, and the infrared heater power available, obtained at block 104. The offset may be proportional to the amount of power available to the infrared heaters 80. For example, if a relatively large amount of power is available to the infrared heaters 80, the offset may be relatively large.

Next, at block 118, a modified target value for the heater core coolant inlet temperature is determined by subtracting the offset (obtained at block 116A) from the base value (obtained at block 114A).

At block 120, the base target value is gradually changed by the offset amount (sometimes called a gap-to-target amount) until the base target reaches the modified target value. Gradually changing the base target value over time prevents undesirable vehicle behaviors, such as rapid changes in engine operation or rapid changes in temperature of the passenger cabin 56. The gradual change may be a linear change between the base target value and the modified target value. Alternatively, the gradual change may be series of relatively small, incremental changes made over time or some other method of transition in which the transition is made to be gradual perhaps through non-linear means such as various types of signal filtering.

At block 122, the power to the infrared heaters 80 is set, and at block 124, the number of infrared heaters 80 to be operated is determined based on vehicle occupancy and the power set at block 122. At block 126, the power is distributed to the IR heaters and the infrared heaters 80 are run according to the determinations made in blocks 122 and 124.

Figure 5:
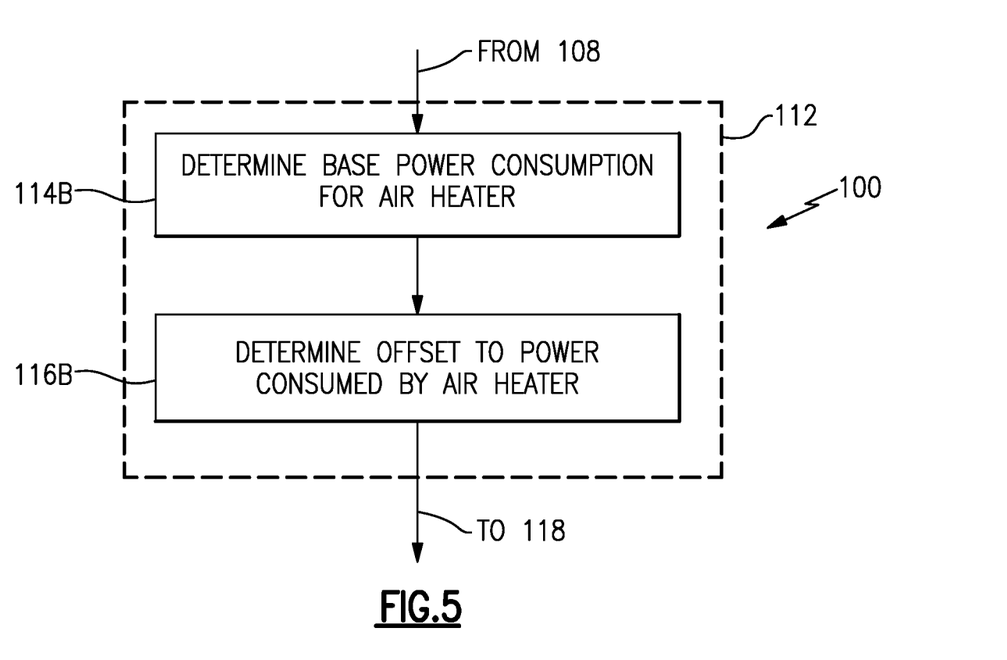
Figure 6:
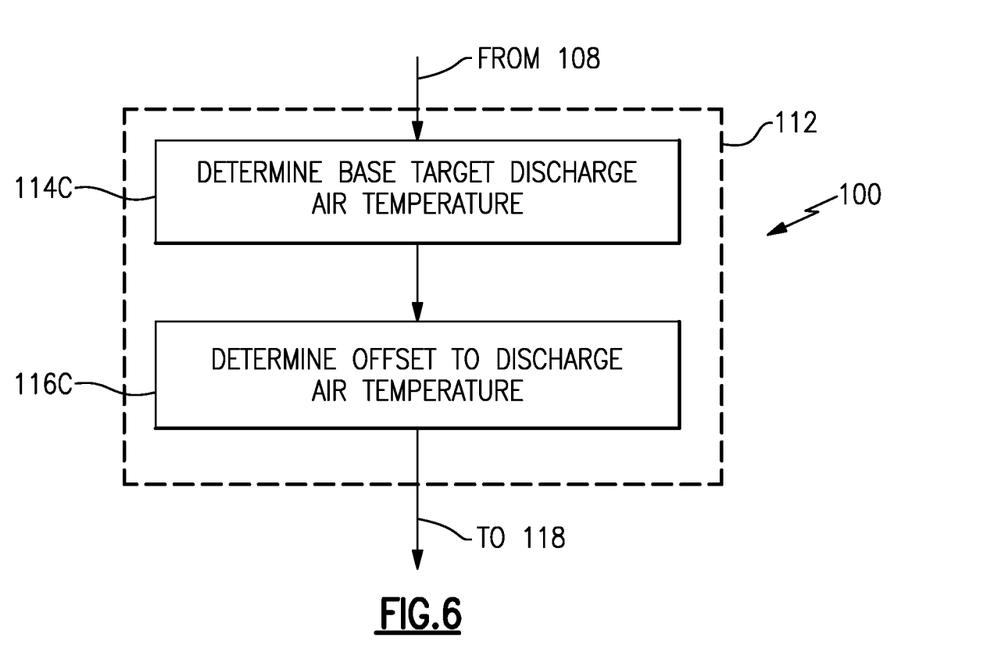
Figure 7:
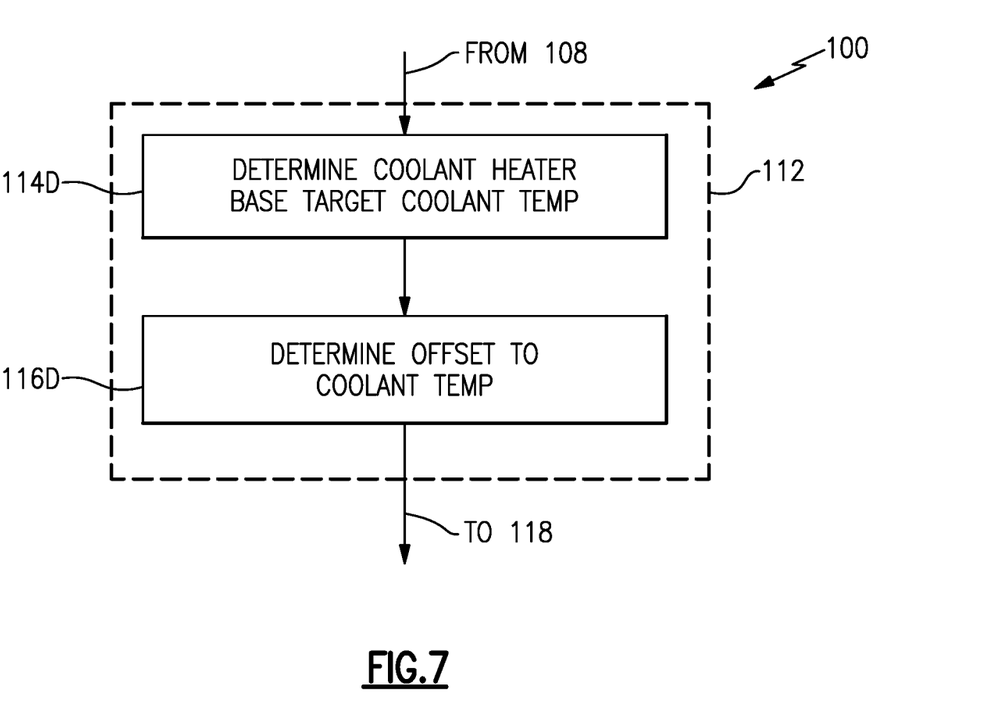

FIGS. 5-7 illustrate the control strategy 100 when applied to different heating devices H. In FIGS. 5-7, the control strategy is substantially the same as described relative to FIG. 4, with the only changes occurring in the heating device-specific portion 112.

FIG. 5 illustrates the control strategy 100 when the heating device H is an air heater controlled based on a target value of amount of power consumed by the air heater. The air heater could be provided by an electrically powered heater such as the electrically powered heater 58, for example. At block 114B, the control strategy 100 determines a base target amount of power to be consumed by the air heater based on the determination in block 108, and then determines, at block 116B, an offset to that amount of power. At block 114B, the base target amount of power may be determined based on a lookup table that relates power consumption to temperature of the conditioned airflow 74-1 or via a direct calculation of the temperature of the conditioned airflow. The offset from block 116B may be determined based on an amount of power available to the infrared heaters 80, which was obtained at block 104 and the other factors which affect climate load as described.

FIG. 6 illustrates the control strategy 100 when the heating device H is an air heater controlled based on a target value of discharge air temperature. As with FIG. 5, the air heater could be provided by an electrically powered heater such as the electrically powered heater 58, for example. While FIG. 5 relates to a target value of power consumption, in FIG. 6 the air heater is controlled based on a sensed or derived temperature of the conditioned airflow 74-1. In FIG. 6, at block 114C, the control strategy 100 determines a base target value for discharge air temperature based on the determination in block 108. At block 116C, the control strategy 100 then determines an offset to that target value based on the determination in block 104.

FIG. 7 illustrates the control strategy 100 when the heating device H is a coolant heater, which may be an electrical coolant heater or other type of coolant heater, controlled based on a coolant temperature. In this example, the control strategy 100, at block 114D, determines a base target value for temperature of the coolant C based on the determination at block 108. At block 116D, the control strategy 100 determines an offset to that target value based on the determination in block 104.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
a passenger cabin;
an infrared heater configured to radiate heat for conditioning the passenger cabin;
a heating device configured to heat airflow for conditioning the passenger cabin; and
a controller configured to selectively command a change in an output of the heating device based on an amount of power available to the infrared heater.

2. The electrified vehicle as recited in claim 1, wherein the heating device is controlled based on a target value, and wherein the controller is configured to selectively change the target value based on an amount of power available to the infrared heater.

3. The electrified vehicle as recited in claim 2, wherein the controller is configured to selectively decrease the target value when sufficient power is available to the infrared heater.

4. The electrified vehicle as recited in claim 3, wherein the controller is configured to gradually decrease the target value when sufficient power is available to the infrared heater.

5. The electrified vehicle as recited in claim 2, wherein the heating device includes a heater core fed by coolant, and wherein the target value is a temperature of coolant at an inlet of the heater core.

6. The electrified vehicle as recited in claim 2, wherein the heating device includes an air heater, and wherein the target value is an amount of power consumed by the air heater.

7. The electrified vehicle as recited in claim 2, wherein the heating device includes an air heater, and wherein the target value is a discharge air temperature.

8. The electrified vehicle as recited in claim 2, wherein the heating device is a coolant heater, and wherein the target value is a coolant temperature.

9. The electrified vehicle as recited in claim 1, wherein the controller is configured to selectively change the output of the heating device based on the amount of power available to the infrared heater, a temperature of the passenger cabin, and an occupancy level of the passenger cabin.

10. The electrified vehicle as recited in claim 1, wherein the infrared heater is one of a plurality of infrared heaters configured to radiate heat for conditioning the passenger cabin.

11. The electrified vehicle as recited in claim 1, wherein the infrared heater is powered by a DC/DC converter.

12. A method, comprising:
conditioning a passenger cabin of a vehicle by radiating heat with an infrared heater and by heating airflow with a heating device; and
changing an output of the heating device based on an amount of power available to the infrared heater.

13. The method as recited in claim 12, further comprising:
controlling the heating device based on a target value, and changing the target value based on an amount of power available to the infrared heater.

14. The method as recited in claim 13, further comprising:
decreasing the target value when sufficient power is available to the infrared heater.

15. The method as recited in claim 14, further comprising:
gradually decreasing the target value when sufficient power is available to the infrared heater.

16. The method as recited in claim 13, wherein the heating device includes a heater core fed by coolant, and wherein the target value is a temperature of coolant at an inlet of the heater core.

17. The method as recited in claim 13, wherein the heating device includes an air heater, and wherein the target value is an amount of power consumed by the air heater.

18. The method as recited in claim 13, wherein the heating device includes an air heater, and wherein the target value is a discharge air temperature.

19. The method as recited in claim 13, wherein the heating device is a coolant heater, and wherein the target value is a coolant temperature.

20. The method as recited in claim 12, further comprising:
changing an output of the heating device based on an amount of power available to the infrared heater, a temperature of the passenger cabin, and an occupancy level of the passenger cabin.

* * * * *